United States Patent [19]

Tanaka

[11] 4,186,484
[45] Feb. 5, 1980

[54] CUTTING HAND TOOL

[75] Inventor: Minoru Tanaka, Higashi-Osaka, Japan

[73] Assignee: Hanazono Kogu Kabushiki Kaisha, Higashi-Osaka, Japan

[21] Appl. No.: 911,148

[22] Filed: May 31, 1978

[30] Foreign Application Priority Data

Sep. 22, 1977 [JP] Japan .................. 52-128521[U]

[51] Int. Cl.² ........................ B23D 21/06; B26D 3/16
[52] U.S. Cl. .......................................... 30/92; 30/251
[58] Field of Search ................ 30/189, 190, 250, 251, 30/92, 192

[56] References Cited

U.S. PATENT DOCUMENTS 2,445,630  7/1948  Page ........................... 30/250 X
3,390,455  7/1968  Florian ........................ 30/251
4,084,317  4/1978  Nakamura ..................... 30/251
4,094,064  6/1978  Nishikawa .................... 30/251 X Primary Examiner—Jimmy C. Peters
Attorney, Agent, or Firm—Armstrong, Nikaido, Marmelstein & Kubobcik

[57] ABSTRACT

A cutting hand tool comprising a receiving jaw for supporting a workpiece in a stable position, a cutting jaw opposed to the receiving jaw and a movable handle for intermittently forcing the cutting jaw into the workpiece through ratchet means. When cutting the workpiece, the cutting jaw in its fully opened position is quickly turned into contact with the workpiece by the movement of the movable handle elastically delivered to the cutting jaw, without resorting to the action of the ratchet means.

7 Claims, 10 Drawing Figures

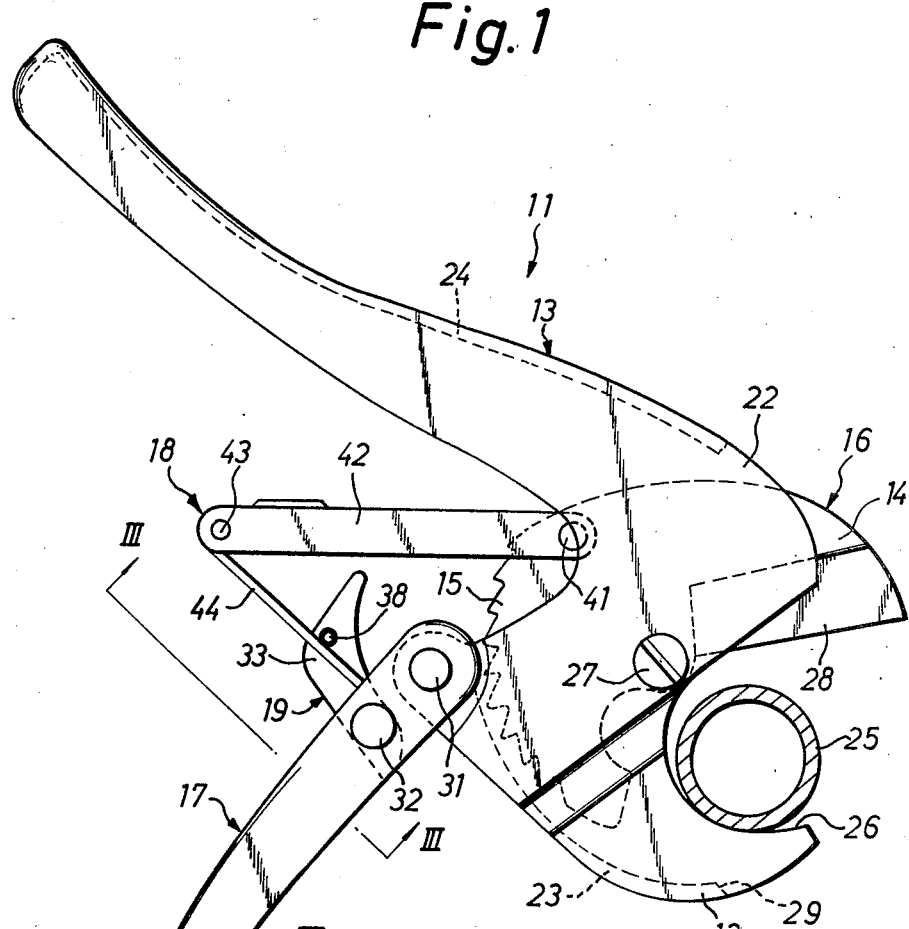
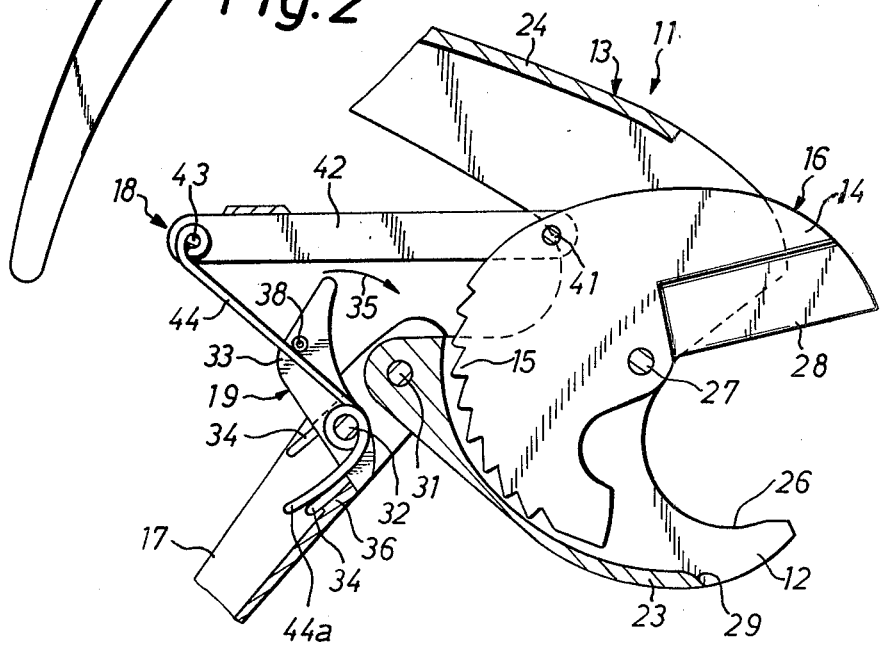

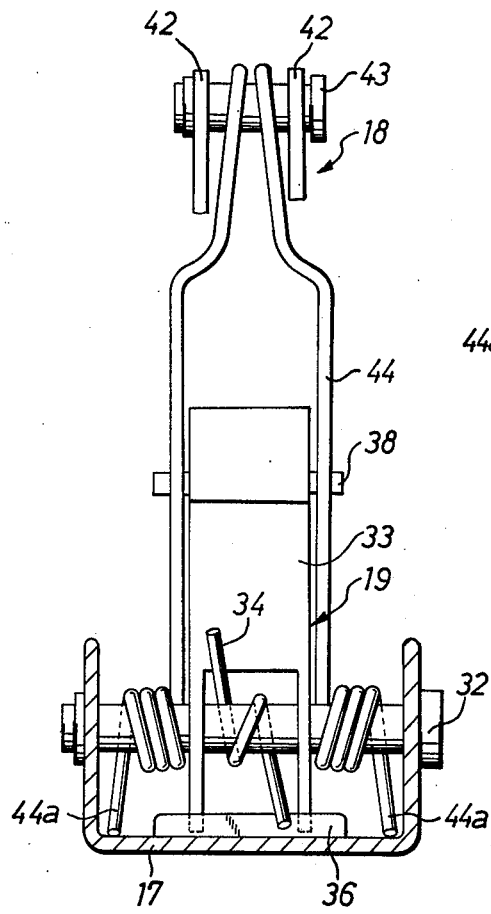
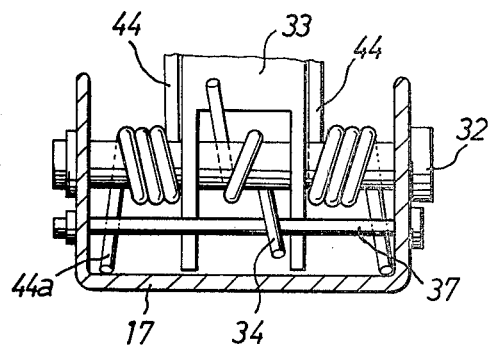
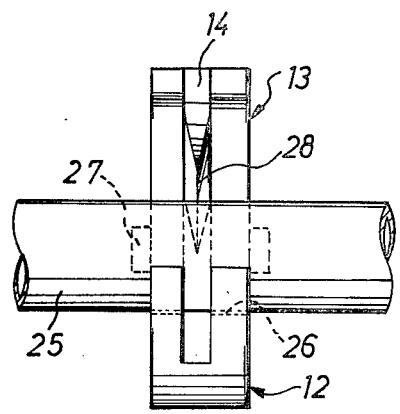
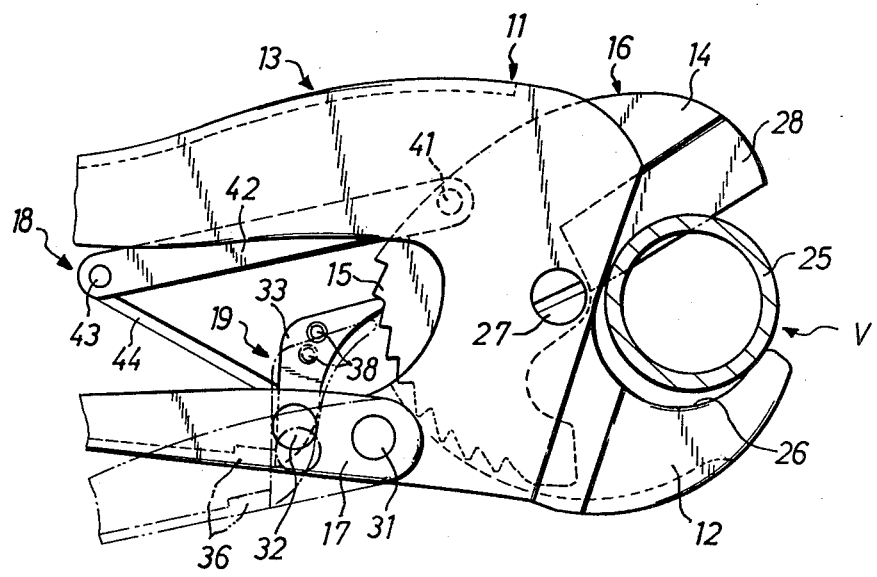

CUTTING HAND TOOL

BACKGROUND OF THE INVENTION

This invention relates to cutting hand tools for cutting pipes of aluminum, plastics or the like, electric cables, thick wires, etc.

Tools of this type include the cutting pliers disclosed in U.S. Pat. No. 3,210,844 and comprising a stationary handle having a first cutting jaw and a pivoted element turnably mounted on the stationary handle. The pivoted element has a second cutting jaw and a toothed segment. The stationary handle carries a ratchet wheel meshing with the toothed segment and is provided with a movable handle pivoted to the handle. When the movable handle is operated, a wedge-shaped ratchet dog mounted thereon and adapted to intermittently engage the ratchet wheel turns the ratchet wheel, which causes the toothed segment to turn the second cutting jaw for cutting operation.

The pliers have difficulty in cutting a workpiece of small diameter with the base portions of the jaws since the workpiece slips outward to a stable position before being firmly clamped by the jaws. Thus, when cutting circular workpieces, the two jaws must apply a cutting force to the workpiece while holding approximately diametrically opposed portions thereof; otherwise the workpiece would slip off the jaws, or would not be cut before slipping to a stable position on the jaws. When initiating a cutting operation, the jaws, which are held in their fully opened position by the action of a spring on the pivoted element, need to be brought into clamping engagement with the workpiece by moving the movable handle a number of times. The idle strokes of the handle required before the substantial cutting operation lead to labor and time losses.

These drawbacks of the prior art are still unavoidable even when the jaws are modified to such a shape as to prevent the escape of the workpiece, for example, to the circular arc shape (of receiving surface) shown in FIG. 1. In fact, the foregoing drawbacks will invariably result when a single tool is adapted for use with various workpieces of varying diameters.

SUMMARY OF THE INVENTION

The main object of this invention is to provide a cutting hand tool comprising a jaw for supporting a workpiece in a stable position and a cutting jaw opposed to the jaw, the cutting jaw, when in its fully opened position relative to the first-mentioned jaw, being closable into contact with the workpiece easily and quickly by the movement of a movable handle delivered directly elastically to the cutting jaw, the cutting jaw, when thus brought into contact with the workpiece, being adapted to start a substantial cutting operation by being intermittently forced into the workpiece until completion of the operation by the movement of the handle delivered to the cutting jaw through ratchet means in the same manner as in conventional tools.

Other objects and advantages of this invention will become apparent from the following detailed description given with reference to the accompanying drawings.

BRIEF DESCRIPTION OF THE DRAWINGS

FIG. 1 is a front view showing a cutting hand tool embodying this invention;

FIG. 2 is a fragmentary view in vertical section showing the tool in FIG. 1;

FIG. 3 is a fragmentary enlarged view in section taken along the line III—III in FIG. 1;

FIG. 4 is a view showing a modified stopper;

FIG. 5A is a fragmentary front view of the tool illustrating its operation;

FIG. 5B is a view showing the tool as it is seen in the direction of an arrow V;

DESCRIPTION OF THE PREFERRED EMBODIMENTS

Figure 6:
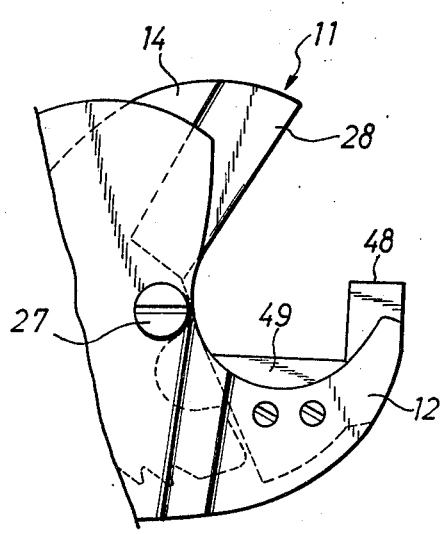
FIG. 6 is a view showing an attachment mounted on a receiving jaw.

FIGS. 1 to 5 show a cutting hand tool 11 embodying this invention. The cutting hand tool 11 comprises a stationary handle 13 having a receiving jaw 12, a pivoted element 16 pivoted to the stationary handle 13 and having a cutting jaw 14 and a toothed segment 15, a movable handle 17 pivoted to the stationary handle 13, advancing means 18 connecting the movable handle 17 to the pivoted element 16 for quickly advancing the element 16, and ratchet means 91 pivoted to the movable handle 17 and engageable with the toothed segment 15.

The stationary handle 13 is in the form of an integral piece composed of substantially Z-shaped opposite side walls 22 and two connecting walls 23 and 24 interconnecting the side walls 22. The receiving jaw 12, which is in the form of a projecting end of the stationary handle 13, has a blade stopper portion 29 and a circular arc surface 26 for supporting a workpiece 25 thereon.

The pivoted element 16 is provided between the side walls 22 of the stationary handle 13 and turnably supported thereon by a bolt 27. The pivoted element 16 is approximately semicircular and has the cutting jaw 14 which is adapted to advance into the receiving jaw 12. The toothed segment 15, which is in the form of a circular arc, is formed along the outer periphery of the element 16. The cutting jaw 14 has a cutting blade 28, which, when advancing into the receiving jaw 12 into contact with the blade stopper portion 29, cuts the workpiece 25 clamped by the jaws. The jaws 12 and 14 may have any of various shapes usually used in tools of this type.

The movable handle 17 is pivoted, at its one end, to the stationary handle 13 by a pin 31. A wedge-shaped ratchet dog 33 is pivotably mounted by a pin 32 on the handle 17 in the vicinity of the pivoted end. The ratchet dog 33 provides ratchet means which intermittently turns the pivoted element 16 by engagement with the toothed segment 15 after the movable handle has been turned a given angle. The ratchet dog 33 is biased by a spring 34 in the direction of an arrow 35 but is prevented from turning in this direction by a stopper 36 provided on the movable handle 17. The ratchet dog 33, while out of engagement with the toothed segment 15, is held at its rear end in contact with the stopper 36 as seen in FIG. 2. The stopper 36 which also serves to retain one end of the spring 34 may be integral with the movable handle 17 as shown in FIG. 2. Alternatively the stopper 36 may be in the form of a pin 37 mounted on the movable handle 17 as illustrated in FIG. 4.

The advancing means 18 includes a link 42 having one end connected to the pivoted element 16 by a pin 41, and a pair of coil springs 44 mounted on the pin 32 on the movable handle 17 and each having one end connected to a pin 43 on the other end of the link 42. The link 42 is a rigid body composed of two strips joined together by a connecting plate.

The other end 44a of each coil spring 44 bears against the side wall of the movable handle 17 or the stopper 36. The coil springs 44 shown in a free state in FIG. 2 are compressed when the movable handle 17 is turned clockwise in FIG. 2 (closing movement). The force of the spring means 44 in a compressed state, namely the expanding force thereof, pushes the link 42, turning the pivoted element 16 clockwise in FIG. 2. The pivoted element is turned in this way until the cutting jaw 14 comes into contact with the workpiece 25. Thus the movement of the movable handle 17 quickly closes the cutting jaw without resorting to the action of the ratchet means. When the movable handle 17 is further turned clockwise (from the two-dot-and-dash position to the solid-line position in FIG. 5A) after the cutting jaw has come into contact with the workpiece 25, the spring means 44 merely are compressed since the force of the spring means is unable to cause the cutting jaw 14 to bite into the workpiece.

With the springs 44 compressed to a certain degree, the tip of the ratchet dog 33 comes into engagement with the toothed segment 15. The clockwise turn of the handle 17 therefore turns the pivoted element 16 clockwise to close the cutting jaw. The handle 17, when turned in a counterclockwise direction, moves the ratchet dog 33 out of engagement with the toothed segment to a retracted position without turning the pivoted element. Repitition of this movement intermittently advances the cutting jaw to cut the workpiece in the same manner as in conventional like tools.

With the advance of the cutting jaw into the receiving jaw 12, the expanding force of the compressed springs 44 reduces to zero, with the result that the spring 44 produce no action when the movable handle is turned counterclockwise after the cutting operation.

The ratchet dog 33 is provided with a pin 38 engageable with the coil springs 44. Preferably the pin 38 is a spring pin, but a usual rod pin is usable. Alternatively projections formed on the opposite sides of the dog 33 may serve the same purpose.

During the counterclockwise return of the movable handle 17, the pin 38 comes into engagement with the expanded spring means 44, whereby the opening movement of the movable handle 17 is delivered to the pivoted element 16 through the ratchet dog 33, pin 38, springs 44 and link 42, returning the cutting jaw 14 to its fully opened position.

FIG. 6 shows an attachement 48 as mounted on the receiving jaw 12. The attachement has an L-shaped receiving surface 49 and is fastened to the receiving jaw 12 by bolts. The attachment 48, when mounted on the receiving jaw, is useful for cutting workpieces of square to rectangular cross section. A number of attachments with receiving portions of varying contours, if prepared, will ensure an easy cutting operation for workpieces of various shapes.

Figure 7:
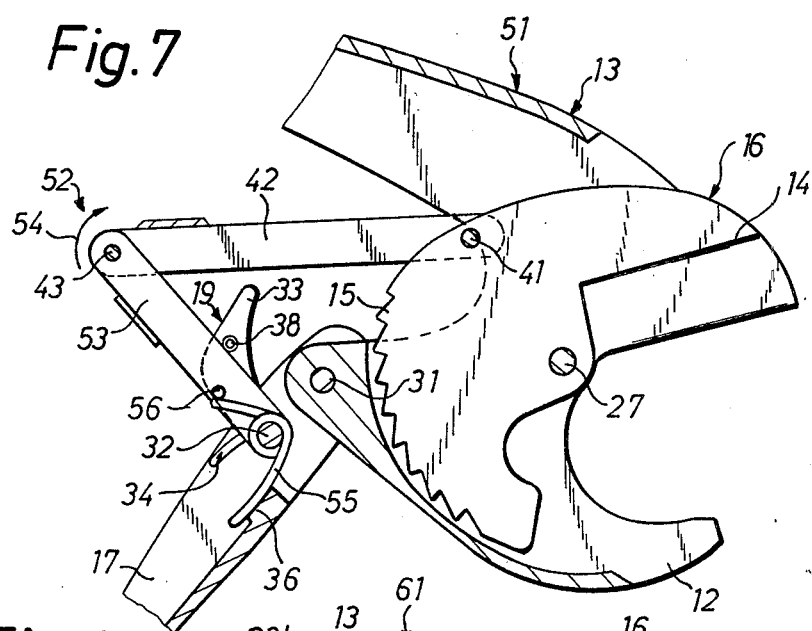
FIG. 7 is a fragmentary front view in section showing another cutting hand tool embodying this invention.

FIG. 7 shows another cutting hand tool 51 embodying this invention. The second embodiment differs from the first only in the construction of the advancing means. The tool 51 has advancing means 52 for quickly advancing the pivoted element 16. The means 52 includes a first link 42, a second link 53 interconnecting the pins 32 and 43, and spring means comprising at least one spring 55 for biasing the link 53 in the direction of an arrow 54. The spring 55 has one end in engagement with a pin 56 on the link 53 and the other end bearing against the stopper 36 on the movable handle 17. The spring 55 biases the link 53 in the same manner as the spring 34 which biases the ratchet dog 33.

When the movable handle 17 is turned clockwise in FIG. 7, the handle 17 comes closer to the pin 43, thus reducing the angle between the handle 17 and the link 53 and compressing the spring 55. The expanding force of the spring 55 is delivered to the pivoted element 16 via the second link 53 and first link 42 to push the element 16 clockwise in FIG. 7. Thus the force quickly advances the element 16 and brings the cutting jaw 14 into contact with the workpiece before the ratchet dog 33 starts to intermittently advance the element 16 by engagement with the toothed segment 15. The cutting jaw 14 is returned in the same manner as in the first embodiment. When the movable handle 17 is returned, the pin 38 on the ratchet dog 33 comes into contact with the link 53, with the result that the movement of the handle 17 is delivered to the pivoted element 16 by way of the ratchet dog 33, pin 38 and links 53, 42.

Figure 8:
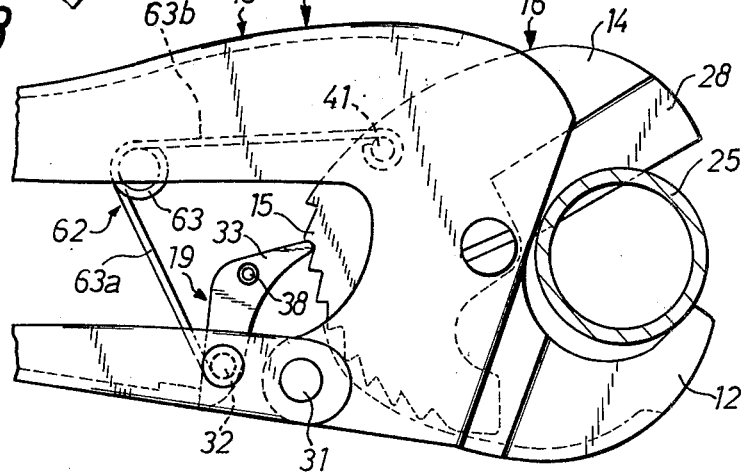
FIG. 8 is a fragmentary front view showing another cutting hand tool embodying this invention.

FIG. 8 shows another cutting hand tool 61 embodying this invention and differing from the first and second embodiments only in the construction of the advancing means. The advancing means 62 of the tool 61 comprises spring means in the form of at least one coil spring 63 connected at its opposite ends to the pin 32 and pin 41.

While the movable handle 17 is so positioned relative to the stationary handle 13 as illustrated in FIG. 1, the angle between the two arms 63a and 63b is obtuse, whereas the handle 17, when turned clockwise in FIG. 8, reduces the angle to an acute angle, causing the spring 63 in a compressed state to turn the pivoted element clockwise. The pivoted element is returned counterclockwise by the counterclockwise turn of the movable handle which brings the pin 38 into engagement with the spring arm 63a, causing the spring 63 to pull the element backward.

Figure 9:
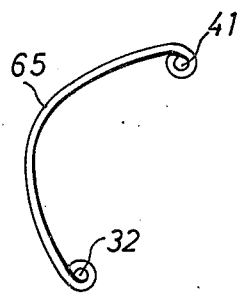
FIG. 9 is a front view showing spring means usable in the tool of FIG. 8.

FIG. 9 shows an arcuate spring 65 made of a wire or strip and usable as the spring means 63 of the tool 61.

It will be apparent from the foregoing description that according to the present invention, the closing movement of the movable handle 17 is elastically delivered to the pivoted element 16 by way of advancing means 18, 52 or 62 which couples a pin 32 on the movable handle 17 to a pin 41 on the pivoted element 16 and by which the distance between the pins is variable, such that when the distance is reduced, the resulting repelling force quickly turns the pivotal element, while rendering the ratchet means 19 engageable with the toothed segment 16. The movable handle, when subsequently turned back and forth, causes the ratchet means to act as a lever, effectively turning the pivoted element. The pivoted element is advanced by degrees by virtue of the intermittent engagement of the ratchet dog with the toothed segment, bringing the cutting jaw 14 toward the receiving jaw 12 to cut the workpiece held between the jaws.

On completion of the cutting operation, the movable handle 17 is returned in a counterclockwise direction in FIG. 1, manually or by the action of a coiled spring which may be provided on the pin 31. This movement retracts the ratchet dog 33, while turning the pivoted element reversely by the engagement of the pin 38 with the spring means 44 or 63 or link 53 and thereby bringing the cuttng jaw to its fully opened position.

In this way, the cutting jaw in its opened position is quickly turnable, without any interruption or without resorting to the intermittent advancing action of the ratchet means, into contact with the workpiece in a stable position by the movement of the movable handle which is delivered directly and elastically to the cutting jaw. Accordingly the tool is easy to operate and assures an efficient cutting operation. Moreover the cutting jaw can be returned smoothly by the return of the movable handle.

What is claimed is:

1. A cutting hand tool comprising a stationary handle having a receiving portion at its head, a movable handle pivoted at its one end to the head of the stationary handle and extending in opposed relation to the stationary handle so as to be grasped by the hand, a pivoted element pivoted to the head of the stationary handle and having a cutting blade opposed to the receiving portion and a toothed segment opposed to the movable handle and having teeth arranged circumferentially of the pivoted element at specified spacing, ratchet means pivoted to the movable handle and engageable with the toothed segment of the pivoted element to intermittently advance the pivoted element in a cutting direction when the movable handle is grasped, an advancing means including a first link and a second link coupling the movable handle to the pivoted element, the advancing means being provided with means for elastically biasing and quickly advancing the pivoted element in the cutting direction before the ratchet means engages the toothed segment of the pivoted element.

2. A cutting hand tool as defined in claim 1 wherein the ratchet means includes a ratchet dog, and the ratchet dog and the second link of said advancing means are pivoted to the movable handle by a common pin.

3. A cutting hand tool as defined in claim 1 wherein the teeth of the toothed segment are arranged on a circular arc line centered about a point where the pivoted element is pivoted.

4. A cutting hand tool as defined in claim 1 wherein the ratchet means comprises a ratchet dog pivoted to the movable handle and engageable with the toothed segment, spring means biasing the ratchet dog to render the dog engageable with the toothed segment, and a stopper provided on the movable handle for preventing the movement of the ratchet dog under the action of the spring means, the ratchet dog being provided with a member engageable with the advancing means to deliver an opening movement of the movable handle to the pivoted element.

5. A cutting hand tool as defined in claim 1 wherein the advancing means comprises a link having one end connected to the pivoted element and at least one coil spring supported by the movable handle and having one end connected to the other end of the link and the other end engaged by the movable handle, the coil spring biasing the link toward the pivoted element.

6. A cutting hand tool as defined in claim 1 wherein the advancing means comprises a first link having one end connected to the pivoted element, a second link having one end connected to the other end of the first link and the other end connected to the movable handle, and spring means positioned close to the other end of the second link and biasing the second link to turn the second link relative to the movable handle and thereby push the first link toward the pivoted element.

7. A cutting hand tool as defined in claim 1 wherein the advancing means is spring means having one end connected to the pivoted element and the other end connected to the movable handle, and the spring means biases the pivoted element when compressed.

* * * * *